J. O. McCARTY.
CLUTCH LOCK FOR MOTOR VEHICLES.
APPLICATION FILED FEB. 5, 1918.
1,283,834. Patented Nov. 5, 1918.
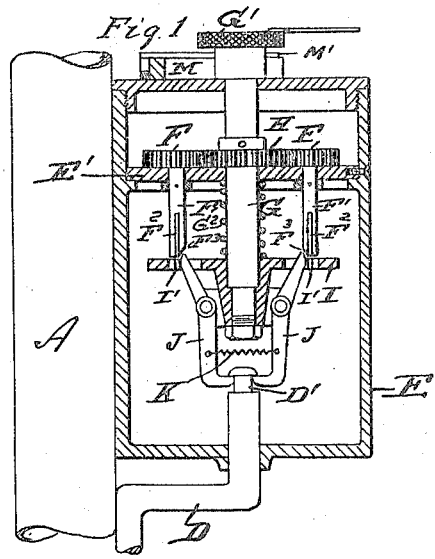
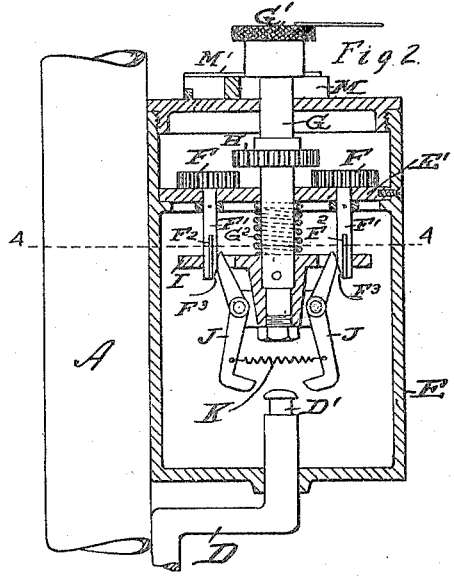
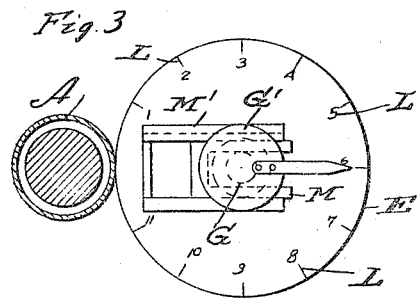
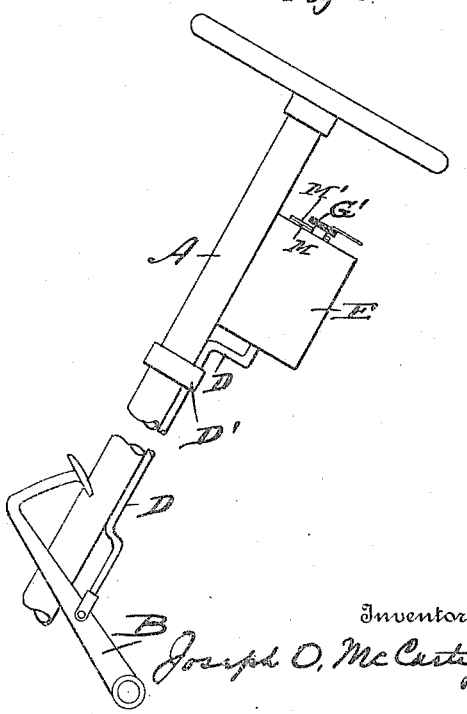
Inventor
Joseph O. McCarty
By S. L. Thomas
Attorney

UNITED STATES PATENT OFFICE.

JOSEPH O. McCARTY, OF DETROIT, MICHIGAN.

CLUTCH-LOCK FOR MOTOR-VEHICLES.

1,283,834.

Specification of Letters Patent.

Patented Nov. 5, 1918.

Application filed February 5, 1918. Serial No. 215,427.

*To all whom it may concern:*

Be it known that I, JOSEPH O. MCCARTY, citizen of the United States, residing at Detroit, county of Wayne, State of Michigan, have invented a certain new and useful Improvement in Clutch-Locks for Motor-Vehicles, and declare the following to be a full, clear, and exact description of the same, such as will enable others skilled in the art to which it pertains to make and use the same, reference being had to the accompanying drawings, which form a part of this specification.

My invention relates to a clutch lever lock for motor driven vehicles.

One object of my invention is to provide means whereby the owner may render the clutch lever of a motor driven vehicle temporarily inoperative that it may not be driven by an unauthorized person.

Another object of the invention is to provide means whereby the clutch lever may be locked or unlocked without the use of a key, thereby avoiding a most common objection to key controlled devices,—the loss or misplacement of the key.

With the foregoing and other objects in view, which will appear as the description proceeds, the invention resides in the combination and arrangement of parts and in the details of construction hereinafter described and claimed, it being understood that changes may be made in the precise embodiment herein disclosed without departing from the spirit of the same.

In the accompanying drawings forming part of this specification,—

Figure 1 is a vertical cross-sectional view through the device showing it attached to a fragment of a steering column;—indicating it in locked relation with a rod (a fragment of which is shown) connected directly with the foot clutch lever.

Fig. 2 is a similar sectional view showing the device in its unlocked, or released relation to the clutch lever.

Fig. 3 is a plan view of the device showing the graduated dial; the steering column being indicated in cross-section.

Fig. 4 is a horizontal sectional view on line 4—4 of Fig. 2.

Fig. 5 is a side-elevation of the device attached to a fragmentary portion of the steering column, and the rod connected with the foot clutch lever.

Referring now to the letters of reference placed upon the drawings:—

A, denotes a steering column. B, indicates a foot lever for controlling the clutch mechanism (not shown).

D, denotes a rod connected with the foot lever B, and slidable in guides D', secured to the steering column. E, is a suitable casing secured to the steering column into which the end of the rod D, projects.

E', is a partition dividing the casing in which are mounted two pinions F, F, spaced apart, provided with downwardly extending stub shafts F', F', journaled in the partition wall, the lower portion of each shaft being fitted with projecting splines $F^2$,—the end of each shaft being preferably beveled as indicated at $F^3$. G, indicates a centrally disposed shaft journaled in the upper and partition walls of the casing E, its outer end being fitted with a milled head G', to facilitate the manual rotation and reciprocation of the shaft. H, denotes a gear mounted on the shaft G, adapted to actuate the pinions F, F, when in mesh with the latter as indicated in Fig. 1 of the drawings.

Secured to the lower end of the shaft G, and rotatable therewith is a disk I, having circular apertures with radial slots I', adapted to receive the ends of the splined stub shafts F', when in registration therewith.

$G^2$, denotes a spring coiled around the shaft G;—one end of which bears against the partition E; and the other end against the disk I, to force the latter to the limit of its movement and the gear H, into driving relation with the pinions F.

Pivoted to the hub of the disk I, are oppositely disposed hook-shaped rocking arms J, J,—the hook shaped portion of which is adapted to engage the peripheral slotted end D', of the rod D, connected with the foot lever.

K, denotes a spring connecting the ends of the rocking arms J, that they may be drawn together to engage the rod. The upper part of the rocking arms J, projects into slots opening into the apertures I', of the disk that the rocking arms may be tripped when brought into contact with the end of the stub shafts F'. The upper wall of the casing E, is graduated as indicated at L, in Fig. 3;—extending from the milled head G', is a pointer adapted to traverse the graduations that the proper number of rotations may be given to the shaft to bring the slotted disk I, and the splined stub shafts F', into registration.

M, denotes a yoke slidable in guides M', formed in the upper wall of the casing which is adapted to be pushed beneath the milled head G', to maintain the gear H, out of mesh with the pinions F, F, as shown in Fig. 2.

Having indicated the several parts by reference letters the construction and operation of the device will be readily understood.

To secure the car against unauthorized use during the absence of the owner, the supporting yoke M, is pushed from beneath the milled head G';—the spring G², then forces downward the shaft G, and with it the disk I, carrying the hook-shaped rocking arm J;—which being freed from the tripping action of the stub shafts engage the peripheral slotted end D', of the rod D, (see Fig. 1) thereby locking the clutch lever as will be readily seen.

In order to release the clutch lever that the vehicle may be again driven, it is first necessary to manually rotate the shaft G, by means of its milled head G', a predetermined number of times known to the owner, in order that the splines of the stub shafts F', may register with the radial slots I', extending from the circular apertures in the disk I. The shaft G, and disk I, attached thereto are then manually raised by means of the milled head G';—the ends of the splined stub shafts upon entering the apertures in the disk, trip the hook-shaped rocking arms J, out of locking engagement with the rod D, as shown in Fig. 2 of the drawings. The slidable yoke M, is then pushed beneath the milled head, thus maintaining the parts in driving relation until it is again desired to lock the car.

Having thus described my invention what I claim is:—

1. In combination with the member to be locked, a device of the character described, comprising a casing, a plurality of pinions spaced apart each having a stub shaft journaled within the casing fitted with projecting splines, a manually slidable and rotatable shaft also journaled in the casing, a gear mounted upon said last named shaft adapted to be brought into mesh with the pinions to rotate the latter, a disk secured to the last named shaft provided with openings corresponding in form to the cross-section of the stub shafts and their projecting splines, and a plurality of rocking elements pivoted to the disk adapted to engage and release the member to be locked upon alternately shifting the disk in a forward or reverse direction.

2. In combination with a member to be locked, a device of the character described, comprising a casing, a plurality of pinions spaced apart each having a stub shaft fitted with a projecting spline and journaled in the casing, a manually slidable and rotatable shaft journaled in the casing, having a gear adapted to be brought into driving relation with the pinions and released therefrom upon sliding said shaft in its bearings, a disk secured to the slidable shaft having openings adapted to register with the stub shafts and their respective splines, rocking arms pivoted to the disk adapted to engage and secure the member to be locked against operation, means for releasing said rocking arms from engagement with the member to be locked, a graduated disk, and means carried by the slidable and rotatable shaft adapted to coöperate with the graduated disk, whereby the shaft may be given the predetermined number of revolutions necessary to place the openings in a slidable disk in registration with the ends of the stub shafts that the disk may be shifted along the latter.

3. In a device of the character described, a member to be locked, a casing, a plurality of pinions spaced apart each having a stub shaft fitted with a projecting spline and journaled in the casing, a manually slidable and rotatable shaft journaled in the casing having a gear adapted to be brought into driving relation with the pinions, a disk secured to the slidable and rotatable shaft having openings corresponding in form with the ends of the stub shafts and their splines, rocking arms pivoted to the disk having hooked ends adapted to engage the member to be locked, resilient means for maintaining said rocking arms in locked relation with said last named member, said rocking arms being adapted to be released from locking engagement with the member to be locked when forced into tripping relation with the stub shafts upon manually shifting the disk.

4. In a device of the character described, a member to be locked, an inclosing case, a plurality of pinions spaced apart each having a stub shaft journaled in the case and fitted with a projecting spline, a manually slidable and rotatable shaft having a gear adapted to be brought into mesh with the pinions, a disk carried by the last named shaft, having openings to receive the ends of the stub shafts when brought into registration therewith by the rotation of the manually rotatable and slidable shaft, hook-shaped rocking members pivoted to said disk adapted to secure the member to be locked against operation, and means for supporting the slidable shaft in an elevated position with its gear out of mesh with the pinions.

5. In combination with a member to be locked, a device of the character described comprising an inclosing case, a plurality of pinions spaced apart each having a stub shaft with a projecting spline and journaled in the case, a manually slidable shaft journaled in the case having a gear adapted to be brought into driving relation with the pinions, a disk secured to the shaft having openings adapted to receive the end of the stub shafts and their projecting splines, rocking arms pivoted to the disk having hooked ends to engage the member to be locked, means for supporting the slidable shaft in an elevated position with its gear out of mesh with the pinions, and resilient means for forcing the gear carried by the slidable shaft into mesh with the pinions upon the withdrawal of the means for supporting the shaft in an elevated position.

In testimony whereof, I sign this specification in the presence of two witnesses.

JOSEPH O. McCARTY.

Witnesses:
NELSON H. HOUSE,
S. E. THOMAS.

Copies of this patent may be obtained for five cents each, by addressing the "Commissioner of Patents, Washington, D. C."